United States Patent [19]

Granz et al.

[11] Patent Number: 4,581,936

[45] Date of Patent: Apr. 15, 1986

[54] ULTRASONIC CAMERA

[75] Inventors: Bernd Granz, Oberasbach; Markus Vester, Bonn, both of Fed. Rep. of Germany

[73] Assignee: Siemens Aktiengesellschaft, Berlin and Munich, Fed. Rep. of Germany

[21] Appl. No.: 602,241

[22] Filed: Apr. 19, 1984

[30] Foreign Application Priority Data

Apr. 27, 1983 [DE] Fed. Rep. of Germany ....... 3315259

[51] Int. Cl.⁴ ............................................. G01N 29/00
[52] U.S. Cl. ......................................... 73/599; 73/606
[58] Field of Search ................ 73/599, 606, 607, 618, 73/624, 626, 1 DV; 128/660; 367/7, 11

[56] References Cited

U.S. PATENT DOCUMENTS

| | | | |
|---|---|---|---|
| 3,937,066 | 2/1976 | Green et al. | 73/607 |
| 4,057,049 | 11/1977 | Hill | 73/599 |
| 4,364,273 | 12/1982 | Redding | 128/660 |
| 4,442,713 | 4/1984 | Wilson et al. | 73/599 |

FOREIGN PATENT DOCUMENTS 2413465 5/1975 Fed. Rep. of Germany .

Primary Examiner—Stephen A. Kreitman
Attorney, Agent, or Firm—John F. Moran

[57] ABSTRACT

A camera includes a transmitter (2), an imaging system (8) for an object (4) and a receiver (10). According to the invention, in order to adjust the output signal ($V_2$) of the receiver (10), a feedback is provided from the receiver (10) to the transmitter (2). The receiver includes a comparator (22) to one of whose inputs the spectrum of the actual values is fed in each case as a rectified output signal ($V_2$) of the receiver (10) and to whose other input are fed corresponding reference values, and which controls the spectrum of the transmitter voltage ($V_1$) of the transmitter (2) according to the deviation. By means of this feedback it is ensured that the same center frequency is always obtained at the receiver (10). As a result, the ultrasonic image is independent of the attenuation of signal caused by the object (4) and, accordingly, always has the same resolution even for different objects.

4 Claims, 6 Drawing Figures

ULTRASONIC CAMERA

BACKGROUND OF THE INVENTION

The invention relates to an ultrasonic camera with a transmitter, an imaging system for an object and a receiver.

In a unit for the real-time representation of ultrasonic images of objects, electrical signals from a transmitter are changed in a converter into ultrasonic signals which penetrate the object to be imaged, which might be a part of the human body, and, as a general rule, are routed, with the aid of an imaging system, to a receiver which acts as an image sensor. The receiver might, for example, consist of a matrix of ultrasonic converters, which change the ultrasonic signals back into electrical signals, preferably into a charge pattern. The matrix is then scanned, line-by-line or column-by-column, and the image can be made visible on a video terminal assigned to the receiver (see, for example German patent document DE-OS No. 24 13 465).

The resolution of the image presented is inversely proportional to the frequency. In a B-scan, a high bandwidth is needed to generate short pulses. In a C-scan a high bandwidth is needed to suppress imaging errors resulting from the coherence of the sonic beam. A point element in the body level of the object that is to be imaged appears, with the aid of the imaging system, at the receiver as a local intensity distribution, whose width represents a parameter which is resolved by the camera. In the receiver, this ultrasonic distribution is converted into electrical signals by means of ultrasonic converters. It is preferable to select the expansion of the individual ultrasonic converters in the image level to be about half as large as the width of the intensity curve. The power of ultrasonic waves to penetrate body tissues is well known to depend on the frequency; high frequencies are more strongly absorbed in the object, and a corresponding displacement of the frequency spectrum is obtained at lower frequencies, with a simultaneous broadening of the intensity distribution.

SUMMARY OF THE INVENTION

It is an object of the invention to provide an ultrasonic camera in which frequency shifts which are dependent on the size and composition of an object to be imaged are avoided.

The foregoing and other objects are realized by providing an ultrasonic camera in which the filter and the transmitter is controlled by special characteristics of a feed-back system in such a manner that it compensates for the low pass characteristics of the object. The feed back system controls the frequency spectrum of the transmitter in accordance with the characteristics of the object in such a manner that a frequency band that is optimal for the imaging is preset in the receiver. By these means, the image presented becomes independent of the attentuation caused by the object, and the same resolution is always obtained for a variety of objects.

In the case of an ultrasonic camera, these design features are equally applicable in both transmission and reflection mode cameras.

The invention provides an improved ultrasonic camera of the type having a transmitter, an imaging signal and receiver. In the improved camera there are provided means for controlling the spectrum of a transmitter voltage (V1) in such a manner that independent of the object which is to be imaged there is always obtained at least approximately a spectrum of an output signal (V2) in the receiver that has the same center frequency ($f_0$) as is generated in the transmitter.

In a further embodiment the ultrasonic camera includes as the means for controlling the spectrum a feedback network which is provided between the receiver and the transmitter. The feedback network includes a comparator with two inputs. The one input is fed to the spectrum of the actual rectified output signal (V2) value of the receiver for each case and to the other input are fed corresponding reference values. The feedback controls the spectrum of the transmitter voltage (V1) of the transmitter according to a predefined deviation criteria.

In a further preferred embodiment it is disclosed that the ultrasonic camera above may include a voltage controlled oscillator to which is connected a voltage controlled amplifier. The output of the voltage controlled oscillator can be controlled in accordance with the deviation that is fed by a switching mechanism to the feedback through a selector switch and a digital analog converter. The switching mechanism has assigned to it a frequency controller which when the deviation is near zero gives a new control word to a reference value and to the transmitter through a switch connected to a synchronization system of the transmitter. The switching mechanism is also equipped to send a write signal to a memory of the transmitter when the deviation nears zero.

Other features and advantages of the invention will be apparent from the following description of the preferred embodiments, and from the claims.

For a full understanding of the present invention, reference should now be made to the following detailed description of the preferred embodiments of the invention and to the accompanying drawings.

DETAILED DESCRIPTION

Figure 1:
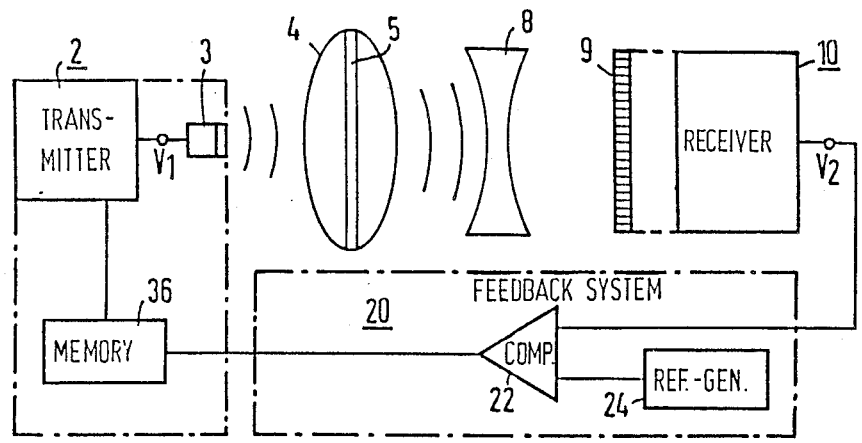
FIG. 1 is a schematic representation of a preferred embodiment of an ultrasonic camera in accordance with the invention.

As shown in FIG. 1, at least one ultrasonic converter 3 with adjustable frequency is assigned to a transmitter 2. The adjustable frequency may be generated by a voltage frequency converter. The converter converts the electrical signals from the transmitter 2 into corresponding ultrasonic signals, which penetrate an object 4, which might, for example, be a part of the human body, of which a layer 5 is to be imaged. The ultrasonic signals are conducted with the aid of an imaging system, which is shown simply as the lens 8, to an ultrasonic converter array 9, which is assigned to a receiver 10 and which converts the intensity distribution of the ultrasonic image, for example, into a corresponding charge pattern. This charge pattern is scanned and can be conducted from the receiver 10, which acts as an image sensor, to a video terminal, not shown in the figure, and reconstructed into a visible image.

The ultrasonic converter array 9 of the receiver 10 can be either a linear system, which scans the image mechanically, or else a receiving matrix. The receivers should have a sufficiently large bandwidth so that their band-pass characteristics do not pass over into the subsequent phase, for example, PVDF. The imaging system supplies as an image of a point source a local intensity distribution with a lateral resolution $\Delta = 1.22 \cdot (\lambda b)/(A)$, where b is the image width and A the aperture of the imaging system. This resolution that is achieved must be scanned with the system of the receiver 10. From the scanning theorem an optimum picture element size $R \approx 0.5\Delta$ can be obtained for the ultrasonic converters of the converter array 9. The picture element size for the converter array 9 is thereby correlated with the frequency of the ultrasonics.

Figure 2:
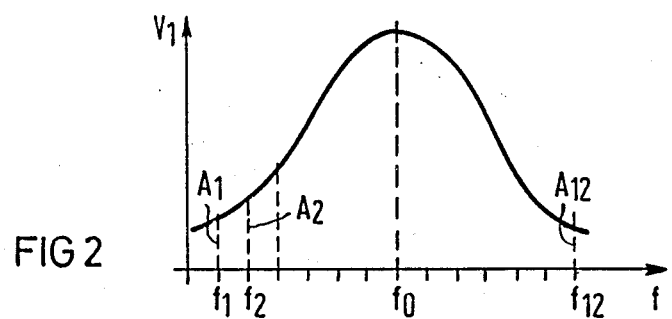
FIGS. 2 and 3 illustrate the shift in the center frequency of the frequency spectrum as transmitted signals pass through an object.

As a general rule, a wide bandwidth is used in the imaging of objects with the aid of an ultrasonic transmission camera. Then if the frequency of the receiver 10 is the center frequency $f_0$ of a frequency band whose frequency spectrum is shown in the diagram of FIG. 2, in which the amplitudes $A_1$, $A_2$ to $A_{12}$ of the selected frequency steps $f_1$ to $f_{12}$ are plotted over the frequency f, the spectrum of the transmitter is voltage $v_1$. Since for a given ultrasonic camera, the picture element size for the ultrasonic converter array 9 is a fixed quantity, we can obtain for each ultrasonic camera a predetermined optimum center frequency $f_o = (1/R) \times (1.22/2) \times C \times (b/A)$, where C is the sonic speed in the carrier medium. In the case of an ultrasonic camera, the carrier medium is usually water. If the receiver 10 obtains this center frequency, the ultrasonic camera functions optimally. This spectrum for the transmission voltage can be generated if the transmitter 2 is swept over a predetermined frequency band.

The frequency of the transmitter voltage $U_1$ is converted by the ultrasonic converter 3 into a corresponding ultrasonic signal. The spectrum of the sonic pressure therefore has a shape that is determined by the shape of the frequency of the transmitter voltage $U_1$.

Figure 3:
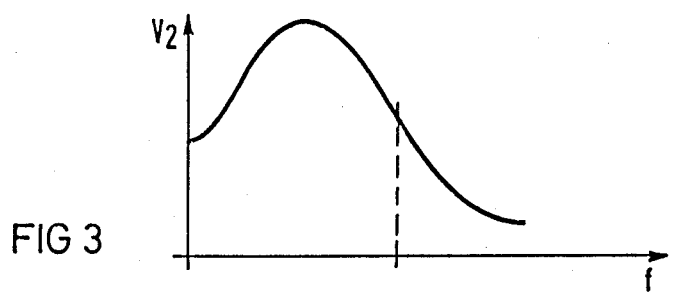

If, for example, a part of the human body is selected as the object 4, then the ultrasonic waves are absorbed according to their frequecny. The attenuation for body tissues measures about 1 dB/cm·MHz. Thus, behind the object 4 a corresponding shift of the spectrum of the ultrasonic wave from the center frequency $f_o$ would result, as is shown in the diagram of FIG. 3, in which the curve for the actual value of the output voltage $V_2$ of the receiver 10 is plotted over the frequency f.

This shift of the spectrum would produce a corresponding reduction in the resolution obtainable by the imaging system.

According to the invention, this is prevented by compensating at the transmitter for the acoustical frequency response with the aid of a feedback system 20 located between the receiver 10 and the transmitter 2, as shown in FIG. 1. It includes a comparator 22, at one input of which is applied, the signal from the receiver 10 (the rectified output voltage $V_2$) and at the other input of which are applied corresponding reference values at the same frequency produced by reference value generator 24. The comparator 22 transmits the necessary transmission level of the transmitter 2. For this purpose, the comparator 22 adjusts the amplitude of the output voltage $V_1$ of the transmitter 2, in accordance with the deviation from the reference value, at the same frequency until the deviation from the reference value is close to zero.

At the beginning of the calibration, the adjustable transmitter 2 is activated and sends a CW signal (continuous wave, sine signal) with amplitude $A_1$ and a frequency $f_1$ (for example, 0.8 MHz) that lies in the requisite frequency band. The corresponding ultrasonic signal is filtered through the low-pass characteristics of the object 4 and the band-pass characteristics of the ultrasonic converter 3 and are rectified in the receiver 10. The signal level of the receiver 10 at the frequency $f_1$ is compared in the comparator 22 with the level at the frequency $f_1$ of the reference value generator, and the transmitter 2 is correspondingly adjusted until the amplitude $A_1$ reaches a value which, for this frequency step $f_1$, gives a value for the output voltage $V_2$ of the receiver 10 according to FIG. 5 which corresponds, at least approximately, to the desired reference value. As soon as the deviation is close to zero, this output signal of the switch mechanism 26 can preferably be entered in a memory 36, which can preferably be a so-called RAM (random access memory). This process is carried out in the course of the calibration phase in another stage with the frequency $f_2$, for example 1 MHz, which, with an amplitude $A_2$ of the transmitter voltage $V_1$ gives the desired level of the receiver voltage, and, in each case, the desired signal is entered in the memory 36. This calibration is continued for a third frequency $f_3$, for example, 1.2 MHz, through further frequency values including the center frequency $f_o$, for example, 2 MHz, up to the frequency $f_{12}$. Then the spectrum of the transmitter voltage $V_1$ which gives the desired spectrum of the receiver voltage $V_2$ is entered in the memory 36. The entire calibration process might, for example, take about 300 ms.

Figure 6:
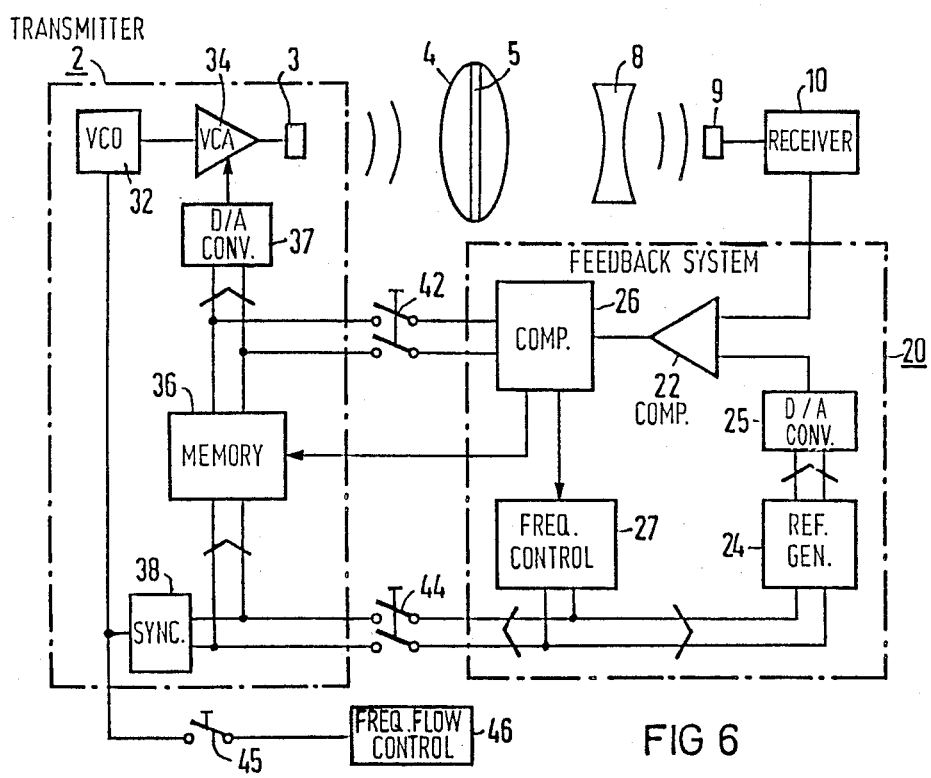
FIG. 6 shows the preferred embodiment of the ultrasonic camera in block diagram.

In the embodiment of an ultrasonic camera according to FIG. 6, the transmitter 2 includes a voltage-controlled oscillator VCO 32 that acts as a voltage-to-frequency converter, to which there is then connected a voltage-controlled amplifier VCA 34, and to which there is also assigned the ultrasonic converter 3. The oscillator 32 sends a predetermined frequency corresponding to a voltage that is fed to it from a synchronization system 38, which in the calibration phase might be a D/A converter, and in the imaging process an A/D converter. The amplitude of the transmitter voltage $V_1$ is amplified by an amplifier 34 to a value that is fed to it from the memory 36 through a digital-analog converter 37. This signal is converted in the ultrasonic converter 3 into a corresponding ultrasonic signal. It passes through the object 4, of which a layer 5 is to be imaged, and is conducted by the imaging system 8, which is shown solely as a convex lens, to the ultrasonic converter array 9, and is there converted into a corresponding electrical signal. The receiver 10 might include, for example, 10,000 amplifiers with corresponding multiplexers and it delivers at its output a rectified signal V, which, for example, might have a signal level of 0.05 V at a frequency $f_1$ of the oscillator 32 which equals to 0.8 MHz. The second input of the comparator 22 receives, through a digital-analog converter 25, the corresponding reference value of, for example, 0.2 V, which has been determined at a frequency of 0.8 MHz. The output signal of the comparator 22 is conducted through a switching mechanism 26, which might, for example, operate according to the successive approximation method and, in that case, has the function of the control logic of an analog-digital converter, and a selector switch 42 which is closed during the calibration phase, to the memory 36 and the digital-analog converter 37.

The selector switch 42 is shown in the figure, for the sake of simplification, as a switch with movable contacts, although in the practical embodiment it is preferable to select a contactless switch. The deviation is conducted, in addition, through a frequency control 27, which might preferably be a counter, and a switch 44, to the synchronization system 38. The switch 44 might preferably also be a contactless switch, which is closed during the calibration phase. The frequency control 27 simultaneously supplies a frequency value to the synchronization system 38. As soon as the deviation is at least close to zero, that is, when the actual value of the receiver voltage $V_2$ corresponds roughly to the reference value, the switching mechanism 26 also supplies a write signal for the memory 36, whereby this signal, which gives the desired amplitude $A'_1$ of the amplifier 34, is entered in the memory 36. At the same time, the frequency control gives the next digital word to the synchronization system 38 through the switch 44. The oscillator 32 receives from the synchronization system a signal with the following voltage step, which corresponds to a frequency of, for example, $f_2 = 1$ MHz, and gives an amplitude $A'_2$ of the amplifier 34.

Figure 4:
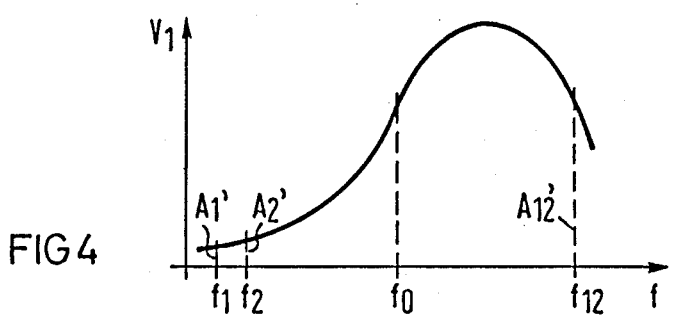
FIGS. 4 and 5 show the compensation for the above frequency shift which is generated through the ultrasonic camera of the present invention.
Figure 5:
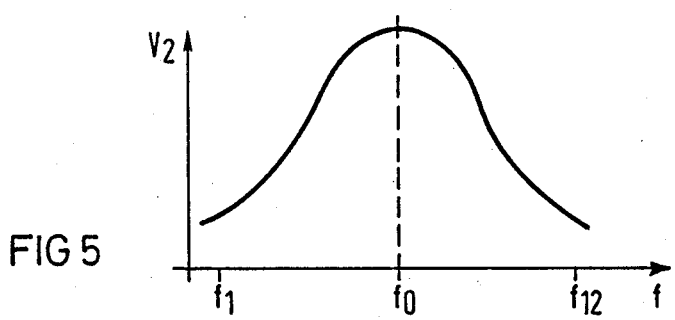

In accordance with the deviation, the comparator 22 adjusts the amplifier 34 through the switching mechanism 26 and the selector switch 42, as well as the digital-analog converter 37 until the deviation is at least close to zero and the output voltage $V_2$ of the receiver 10 reaches the desired value $A'_2$. Then the switching mechanism 26 generates both the write signal to the memory 36 and the control signal for the next step to the frequency control 27 and through the switch 44 to the synchronization system 38, which provides to the oscillator 32 the control voltage for the following frequency step, which might, for example, correspond to a frequency $f_3$ of 1.2 MHz. By means of the feedback 20, the transmitter 2 is also modulated according to this frequency. In this way, during the calibration phase, the transmitter 2 is modulated step by step to the frequency $f_{12}$, and the control signals corresponding to these frequencies are in each case entered in the memory 36. Each time, when the deviation is at least approximately equal to zero, the reference value generator 24 also receives from the frequency control 27 its signal for the output of the next reference value. The digital values corresponding to the frequency steps $f_1$ to $f_{12}$ for the amplitudes $A'_1$ to $A'_{12}$ of the transmitter voltage $V_1$ from the transmitter spectrum in FIG. 4, which give the desired spectrum of the output voltage $V_2$ of the receiver 10 in FIG. 5, are stored in the memory 36.

As soon as the calibration is completed, the selector switches 42 and 44 are opened and the switch 45 is closed. Then the synchronization system 38 receives from a frequency flow control 46 of the ultrasonic camera a control signal in the form of a sawtooth voltage, in which a predetermined frequency $\Delta f_1$, which, for the first frequency step, might, for example, range from 0.7 to 0.9 MHz, corresponds to a predetermined interval of time $\Delta t_1$. The synchronization system 38 then gives a corresponding control command to the memory 36, which supplies the digital value for the voltage amplification at the frequency $f_1$ through the digital-analog converter 37 to the amplifier 34. At the end of the period $t_1$, the next interval begins, the synchronization system 38 sends the second word and the memory 36 controls the amplifier 34 through the digital-analog converter 37, with the next transmitter voltage value.

During operation, the frequency resolution of the amplitude compensation is limited for a rapid sweep of the transmitter 2, since there is no sharp instantaneous frequency. A total bandwidth B and a time T is assumed for the sweep signal, which consists of k separately modulated sections of the width $\Delta f$ or $\Delta t$, respectively. As a result, the spectral energy density of adjacent sections can be separately selected, so long as $\Delta f \cdot \Delta t \geqq 1$. Thus, for a linear sweep signal, $$\frac{B}{A} \cdot \frac{T}{k} \geqq 1.$$

We, therefore obtain $k = T \times B$, where T is the duration of the sweep and B is the bandwidth. For a sweep duration T of, for example, 150 us and a bandwidth B of, for example, 1 MHz, we obtain an optimal number of sections:

$$k_{opt} = \sqrt{150} \simeq 12.$$

In this manner, finer standing waves of the frequency response up to 1/12 MHz can be compensated. Even though $k = 12$, scanning values are sufficient. It is preferable, nevertheless, to store a higher number of values—16, for example—in order to achieve a better interpolation.

There has thus been shown and described an ultrasonic camera which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. In an ultrasonic camera having a transmitter, an imaging system and a receiver, the improvement, comprising: means for controlling the spectrum of a transmitter voltage ($V_1$) of said transmitter, said means operating such that independent of an object that is to be imaged, there is always obtained, at least approximately, a spectrum of an output signal ($V_2$) for said receiver that has the same center frequency ($f_0$).

2. An ultrasonic camera in accordance with claim 1, wherein said means comprise output signal ($V_2$) of the receiver, a feedback network from said receiver to said transmitter, said feedback including a comparator to one of whose inputs is fed the spectrum of the actual rectified output signal ($V_2$) value of said receiver for each case and to whose other input are fed corresponding reference values, said feedback controlling the spectrum of said transmitter voltage ($V_1$) of said transmitter according to a predefined deviation criteria.

3. Ultrasonic camera in accordance with claim 1, wherein said transmitter includes a voltage controlled oscillator, to which a voltage controlled amplifier is connected, whose output voltage can be controlled in accordance with the deviation that is fed by a switching mechanism to the feedback through a selector switch and a digital-analog converter, and that the switching mechanism has assigned to it a frequency control which, when the deviation is near zero, gives a new control word to the reference value generator and, through a switch, to a synchronization system of the transmitter, and that the switching mechanism is also equipped to send a write signal to a memory of the transmitter when the deviation nears zero.

4. Ultrasonic camera in accordance with claim 2, wherein said transmitter includes a voltage controlled oscillator, to which a voltage controlled amplifier is connected, whose output voltage can be controlled in accordance with the deviation that is fed by a switching mechanism to the feedback through a selector switch and a digital-analog converter, and that the switching mechanism has assigned to it a frequency control which, when the deviation is near zero, gives a new control word to the reference value generator and, through a switch, to a synchronization system of the transmitter, and that the switching mechanism is also equipped to send a write signal to a memory of the transmitter when the deviation nears zero.

* * * * *